INVENTORS
MOYLEN D. HESLOP
HARRY C. HARVEY JR.

BY *John F. Lawler*
ATTORNEY

United States Patent Office 3,324,401
Patented June 6, 1967

3,324,401
DIRECT INDICATING FREQUENCY DETERMINING CIRCUIT EMPLOYING PEAK DETECTING COMBINED DELAYED AND UNDELAYED SIGNALS OF UNKNOWN FREQUENCY
Moylen D. Heslop, Mountain View, and Harry C. Harvey, Jr., San Jose, Calif., assignors to Sylvania Electric Products Inc., a corporation of Delaware
Filed June 1, 1964, Ser. No. 371,368
3 Claims. (Cl. 329—110)

This invention relates to frequency measuring circuits, and more particularly to an improved frequency discriminator having a response time in the order of a few periods of the incident signal.

One modulation technique employed in pulse communication systems is pulse frequency modulation in which the frequencies within the envelopes of successive pulses are different. The bit rate and speed of operation of such a pulse system are limited by the number of cycles of the received signal that must be present in order to determine the signal frequency. Conventional frequency discriminators, such as LC type discriminators, require in the order of 20 or more cycles of the received signal in order to determine signal frequency. This invention concerns an improved discriminator circuit which substantially decreases the number of cycles which must be "read" to make this determination.

An object of this invention is the provision of an improved discriminator circuit capable of making a determination and measurement of an unknown frequency in an interval of time corresponding to a few periods of the incident signal.

Another object is the provision of such a discriminator circuit which is relatively simple in design.

In accordance with this invention, the incident signal having an unknown frequency is divided into two parts, one delayed, the other undelayed. The time of the delay is in the order of the period of the incident signal. The delayed and undelayed parts of the signal are then compared to derive a difference signal which has an amplitude that is directly proportional to the frequency of the incident signal. The amplitude of the difference signal is peak detected to provide a direct indication of the frequency of the incident signal.

This invention and these and other of its objects may be more clearly understood from the following detailed description thereof together with the accompanying drawings in which:

FIGURE 2 illustrates typical waveforms of signals passing through the circuit of FIGURE 1 wherein FIGURE 2A is a waveform of the undelayed signal;

FIGURE 2B is a waveform depicting a delayed signal; and

FIGURE 2C is a waveform representing the difference between the signals of FIGURES 2A and 2B;

Figure 1:
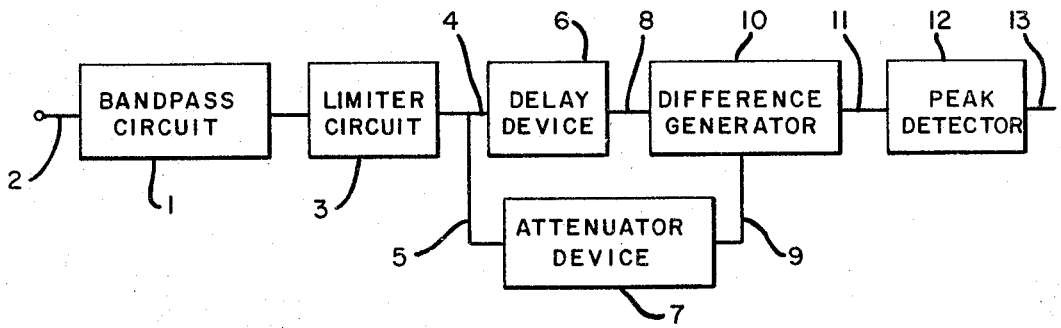
FIGURE 1 is a block diagram of a frequency discriminator embodying this invention.

Referring to FIGURE 1 of the drawings, an embodiment of the invention comprises a bandpass circuit 1 having an input line 2 on which signals having a frequency to be measured are applied. Bandpass circuit 1 has frequency limits $f_2$ and $f_3$ which determine the band of frequencies on which the discriminator operates. These limits are dictated by the signals of interest and other limitations described more fully below. Bandpass circuit 1 may, by way of example, comprise a filter, having a bandwidth $f_2$ to $f_3$, and an amplifier having automatic gain control (AGC) to provide a constant amplitude output within a fraction of a cycle of the input signal.

The output of bandpass circuit 1 is fed to a limiter circuit 3 which produces a more constant amplitude output signal. The output of limiter 3 is divided between lines 4 and 5 which connect to a delay device 6 and an attenuator device 7, respectively.

The delay device 6 has a predetermined time delay $t_d$ which is one period of a known predetermined frequency $f$ which is adjacent to the bandpass $f_2$ to $f_3$ of circuit 1. The delay device delays the portion of the signal passing through it by the time $t_d$. Attenuator device 7 has an attenuation characteristic equal to that of delay device 6 so that signals appearing at the outputs 8 and 9 of delay device 6 and attenuator device 7, respectively, are substantially identical except for the relative time delay $t_d$ introduced by delay device 6.

The outputs of delay device 6 and attenuator device 7 are compared in a difference generator 10 in order to derive a difference signal at the output 11. Difference generator 10 may, by way of example, be a difference amplifier or other similar subtraction circuit.

A peak detector 12 connected to line 13 detects the peak magnitude of the difference signal to produce on line 13 an output having an amplitude which is directly proportional to the frequency of the incident signal on line 2. Peak detector 12 is a circuit of well-known design.

Figure 2:
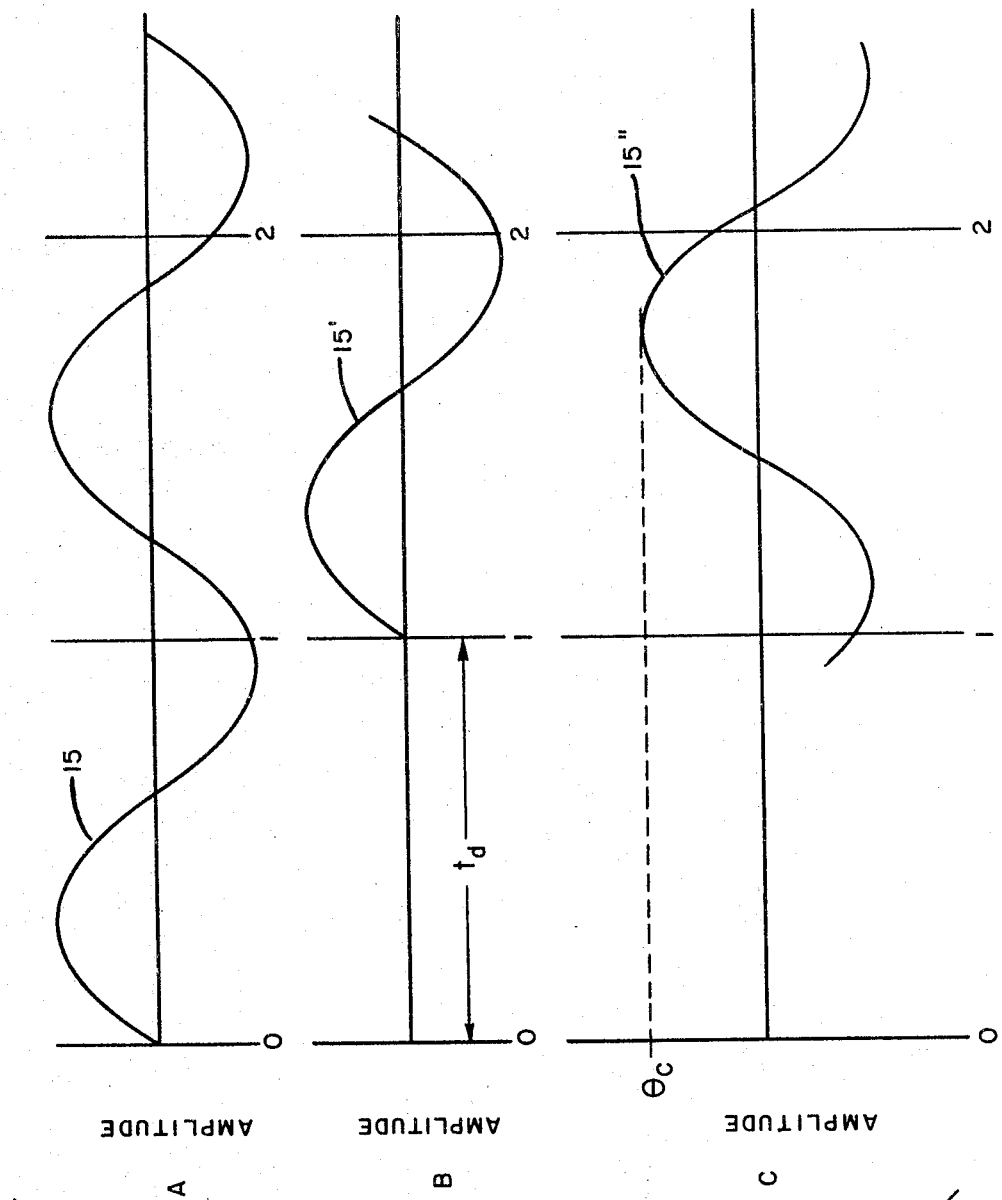

In order to analyze the operation of the circuit, an assumption is made that the frequency $f_0$ of the incident signal on line 2 is equal to the sum of a predetermined or known frequency $f$ and an unknown frequency $\Delta f$. The time delay $t_d$ of delay device 6 is equal to $1/f$. The input signal on line 2 is assumed to be sinusoidal in form and is represented by the waveform 15 in FIGURE 2A. Since the waveform 15 is diminished only in amplitude after passing through bandpass circuit 1 and limiter circuit 3 and attenuator device 7, the output of attenuator device 7 has the same shape as waveform 15 but is smaller in amplitude. Waveform 15' in FIGURE 2B represents the output of delay device 6. It will be noted that the signal 15', see FIGURE 2B, is delayed by the time $t_d$ relative to the signal 15 of FIGURE 2A. Waveform 15" shown in FIGURE 2C is proportional to the difference between waveforms 15 and 15' and designates the difference generator output on line 11. The difference signal is sinusoidal in shape as shown.

Consider an incident signal varying sinusoidally as a function of time and represented by the equation $$E_{\text{in}} = A \sin 2\pi(f+\Delta f)t \qquad (1)$$

where A represents the signal amplitude and $(f+\Delta f)$ is the frequency of the incident signal. If the incident signal frequency $f+\Delta f$ is within the bandpass $f_2$ to $f_3$ of circuit 1, it is limited by circuit 3 to provide a constant amplitude output which is applied to delay device 6 and attenuator device 7. The attenuated signal on line 9 is represented as $$E_{\text{atten}} = \alpha B \sin 2\pi(f+\Delta f)t \qquad (2)$$

where B is the magnitude of the constant amplitude output of limiter 3 and $\alpha$ is the signal attenuation introduced by the attenuator device 7, see waveform 15, FIGURE 2A.

The delay device output on line 8 is a constant amplitude signal delayed by a time increment $t_d$ with respect to the signal on line 9 is represented by $$E_{\text{delay}} = \beta B \sin 2\pi (f+\Delta f)(t-t_d) \qquad (3)$$

where $\beta = \alpha$ and is the attenuation introduced by delay device 6, see waveform 15' in FIGURE 2B.

Difference generator 10 compares the delayed and undelayed signals and produces an output that is proportional to the difference between them, see waveform 15" in FIGURE 2C. This difference signal is denoted by the expression $$E_{\text{diff}} = \left[ 2\beta B \sin \pi \frac{(f+\Delta f)}{f} \right] \left[ \cos \left\{ 2\pi(f+\Delta f)t - \pi \frac{(f+\Delta f)}{f} \right\} \right] \qquad (4)$$

Figure 3:
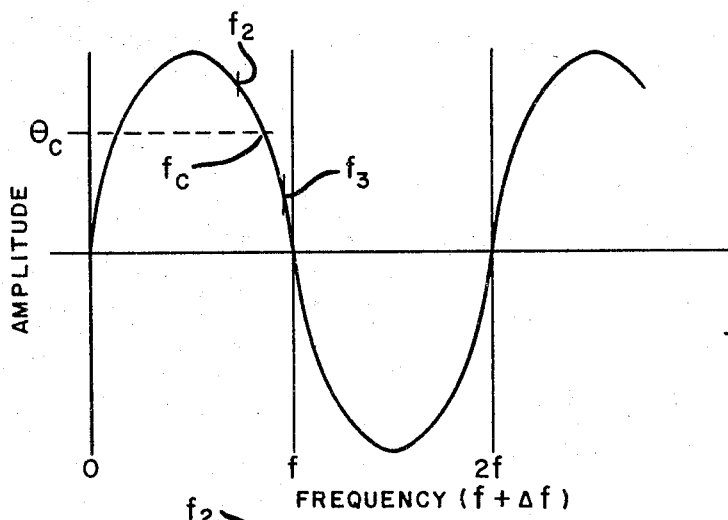
FIGURE 3 is a waveform denoting the amplitude component of the difference signal.

The difference signal described in Equation 4 comprises a first term denoting the amplitude of the signal and a second term which varies with time. The second term varies sinusoidally as a function of time, with a frequency $f+\Delta f$ equal to the frequency of the incident signal, and has a fixed phase shift which is proportional to the frequency $f+\Delta f$ of the incident signal. The first or amplitude term varies sinusoidally as the function of the frequency $f+\Delta f$ as illustrated by the waveform of FIGURE 3.

The output of peak detector 12 is represented as $$E_{\text{pk}} = \left| 2\beta B \sin \pi \frac{f+\Delta f}{f} \right| \qquad (5)$$

Figure 4:
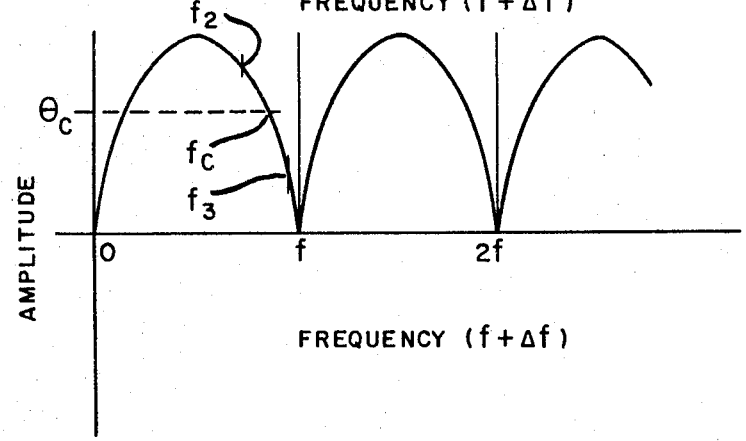
FIGURE 4 is a diagram showing the waveform of the detector output.

The detector output for an incident signal having a fixed frequency $f_c = f+\Delta f$ within the frequency band of $f_2$ to $f_3$ is a signal having a constant amplitude $\theta_c$, see FIGURE 4. The constant amplitude $\theta_c$ of the difference signal is also indicated on the waveforms of FIGURES 3 and 2C. The waveform 15" of FIGURE 2C was plotted for the signal $f_c = f+\Delta f = 0.9f$.

The output of peak detector 12 is proportional to the peak or absolute magnitude of the difference signal and is thus maximum when the time-varying cosine component of Equation 4 is equal to one. As a time-varying sinusoidal signal goes through one positive and one negative peak during each cycle, the peak detector provides an indication of the frequency of the incident signal within one period of the predetermined frequency $f$ plus one period of the frequency $f+\Delta f$ of the incident signal.

As noted, bandpass circuit 1 determines the band of frequencies (e.g., $f_2$ to $f_3$) to which the discriminator is responsive. This frequency band may extend between a frequency $mf/2$ (where $m$ is an odd integer) corresponding to the maxima in FIGURE 4 and an adjacent frequency $nf/2$ (where $n$ is an even integer) corresponding to a zero in FIGURE 3. Reference to FIGURE 3 reveals, however, that it is difficult to accurately determine signal frequencies near these maxima and zeros. Thus, the pass band of circuit 1 is preferably limited to a frequency band such as $11f/16$ to $15f/16$ (corresponding to the frequencies $f_2$ and $f_3$, respectively) where the variation in the amplitude of the output signal for a unit change in frequency is fairly large and linear and different from zero.

It will be understood that various changes in detail and arrangement of elements described herein may be made by those skilled in the art within the principle and scope of the invention as expressed in the appended claims.

What is claimed is:

1. A frquency discriminator responsive to an incident signal having an unknown frequency $f+\Delta f$, where $f$ is a predetermined frequency and $\Delta f$ is a frequency different from the predetermined frequency, for producing an output voltage proportional to and indicating the unknown frequency $f+\Delta f$ of the incident signal, said discriminator comprising a filter having upper and lower frequency limits, one of said frequency limits being approximately equal to $mf/2$, where $m$ is an odd integer, and the other of said frequency limits being approximately equal to $nf/2$, where $n$ is an even integer adjacent the odd integer $m$, said filter being responsive to and passing incident signals within said limits, a limiter responsive to signals passed by said filter for providing constant amplitude output signals, a delay line having an input connected to the output of said limiter, having an output and having a delay equal to the reciprocal of the predetermined frequency $f$, an attenuator having an input connected to the output of said limiter, having an output and having an attenuation characteristic equal to that of said delay line, a circuit combining the outputs of said delay line and said attenuator for producing an output having a magnitude which is a sinusoidal function of $$K \frac{f+\Delta f}{f}$$

where

K is a constant, and a peak for detecting the output of said circuit for providing an output voltage proportional to the unknown frequency $f+\Delta f$ of the incident signal.

2. A frequency discriminator responsive to a sinusoidally varying incident signal having an unknown frequency $f+\Delta f$, where $f$ is a predetermined frequency and $\Delta f$ is a difference in frequency from the predetermined frequency, for producing an output voltage proportional to and indicating the unknown frequency $f+\Delta f$ of the sinusoidal incident signal, said discriminator comprising a filter having an input and an output and having upper and lower frequency limits defining the band of signal frequencies passed by said filter, one of said frequency limits being approximately equal to $mf/2$, where $m$ is an odd integer, the other one of said frequency limits being approximately equal to $nf/2$, where $n$ is an even integer adjacent the integer $m$, means for applying the incident signal of unknown frequency to the input of said filter, a limiter having an input connected to the output of said filter and having an output, a delay line having an input connected to the output of said limiter, having an output and characterized by a time delay equal to the reciprocal of the predetermined frequency, an attenuator having an input connected to said limiter output and having an output, said attenuator and said delay line having equal signal attenuation characteristics, a difference amplifier having a first input connected to the output of said delay line and a second input connected to the output of said attenuator and having an output, said difference amplifier producing an output proportional to the difference between the delayed signal and the attenuated signal, and satisfying the relationship $$\left[ a \sin b \frac{f+\Delta f}{f} \right] \left[ c \cos \left\{ d(f+\Delta f t - e \frac{f+\Delta f}{f} \right\} \right]$$

wherein $a$, $b$, $c$, $d$, and $e$ are constants, $t$ is time and the first bracketed term is a constant proportional to the unknown frequency $f+\Delta f$ of the incident signal, and a peak detector responsive to the output of said difference amplifier for detecting the difference signal for providing an output voltage proportional to the unknown frequency $f+f$ of the sinusoidal incident signal.

3. The frequency discriminator according to claim 2 wherein $m=1$, $n \leq 2$, $\Delta f \leq f$, and the predetermined frequency is adjacent one of the limits of said filter for providing a discriminator indicating the unknown frequency of the incident signal within three cycles of the predetermined frequency.

References Cited
UNITED STATES PATENTS

| | | | |
|---|---|---|---|
| 2,580,148 | 12/1951 | Wirkler | 329—145 X |
| 3,107,329 | 10/1963 | McSkimin | 324—83 |

ROY LAKE, *Primary Examiner.*
A. L. BRODY, *Assistant Examiner.*